3,244,624
TREATMENT OF SYNTHETIC FILAMENTS AND
COMPOSITION THEREFOR
Walter Hagge and Josef Düsing, Leverkusen, and Joachim Kolbe, Cologne-Flittard, Germany, assignors to Farbenfabriken Bayer Aktiengesellschaft, Leverkusen, Germany, a German corporation
No Drawing. Filed Aug. 28, 1962, Ser. No. 220,059
Claims priority, application Germany, Sept. 4, 1961,
F 34,847
6 Claims. (Cl. 252—8.75)

The present invention relates to a new and improved process and composition for the treatment of synthetic filaments, e.g., of rayon, polyamides, polyurethanes and polyesters.

The process of the invention is accomplished by treating synthetic filaments suitable for cord with an about 1–30% aqueous emulsion of mixtures of the components A, B and C which are defined below.

The component A is a vegetable oil or fat emulsion containing at least 60% of oils or fats which are emulsified with a mixture of emulsifiers consisting of substantially equal parts by weight of the reaction product of castor oil with less than 18 mols of alkylene oxide, preferably about 10 to 17 mols of ethylene oxide, and the reaction product of a saturated aliphatic $C_{12}$–$C_{14}$ alcohol with less than 5 mols of alkylene oxide, preferably 3 to 4 mols of ethylene oxide.

The component B is a salt of saturated N-acyl-N-alkyl-amino-alkylene-carboxylic acids of the general formula

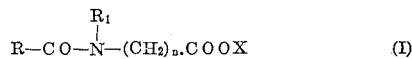

$$R-CO-\underset{R_1}{N}-(CH_2)_n.COOX \qquad (I)$$

and component C is a salt of saturated alkylsulfonamido alkylene carboxylic acids of the general formula

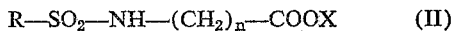

$$R-SO_2-NH-(CH_2)_n-COOX \qquad (II)$$

In the above Formulae I and II, R means aliphatic radicals of $C_{10}H_{21}$ to $C_{19}H_{39}$, $R_1$ a lower alkyl radical, X stands for radicals of aliphatic or cycloaliphatic amines and $n$ is an integer from 1 to 4.

Starting compounds which may be used in the preparation of component B are e.g. α-N-stearoyl-N-methyl-amino acetic and α-N-palmityl-N-ethylaminopropionic acid. Suitable starting compounds in the preparation of component C are e.g. dodecylsulfonamido acetic acids and mixtures of alkyl sulfonamido acetic acids which are obtainable from technical sulfochlorination products of high molecular weight hydrocarbons boiling within the range of 300–470° C. by conversion into the corresponding sulfonamide compounds and subsequent reaction with chloroacetic acid.

Suitable amines in the preparation of the components B and C include hydroxy alkyl amines such as mono-, di- and triethanol amine, as well as polyamines such as diethylene triamine and triethylene tetramine; as cycloaliphatic amines which may be used in the process of the invention there may be mentioned cyclohexyl amine, methylcyclohexyl amine and methyl-ethyl-cyclohexyl amine.

The specific choice of the components A, B and C which are stable as such as well as in the mixtures to be used according to the invention even at high temperatures, allows a good penetration of the reviving agent into the cord filaments as well as the formation of a strong protective film on the surface of the filament. The fibres and filaments treated according to the invention are distinguished by an outstanding supple handle without an appreciable decrease of the strength properties of the cord being detectable in the twisting process.

Further beneficial properties of the fibres and filaments treated according to the invention are described in the examples below. Cord rayon which has been treated with the previously known reviving agents, does not show these advantages to the same degree.

In general it is advisable to choose the ratio of the individual components in such a manner that the entire mixture contains about 40 to 80% of the component A and about 20 to 60%, of the components B and C, which are preferably used in equal quantities. The ratio of the three components however can vary within wide limits.

In the treatment of polyamide yarn it is preferable to use the component A in an amount as high as possible, preferably up to 80%, since a high oil content is beneficial to the cording of polyamide filaments. In some cases it may be advantageous to add to the mixture of the three components A, B and C, further auxiliaries e.g. sorbite fatty acid esters, such as sorbite palmitate and sorbite stearate. The addition of the aforesaid esters results in an improved compactness in the treatment of viscose cord rayon filaments.

The invention will now be further illustrated in the following examples without being restricted thereto; the percentage figures given are percent by weight, while the parts are parts by weight.

Example 1

After deacidifying, desulfurizing and thoroughly washing out the desulfurizing agent, viscose rayon (1750 denier) is treated at 55° C. for 1½ hours with an aqueous emulsion containing per liter 3 g. of a mixture consisting of 55% of component A, 20% of component B and 25% of component C; the preparation of the components A, B and C is described further below. The filaments are dried at 70–75° C. and placed for 3 days in an atmosphere of a moisture content of 95–100% until the moisture content of the filaments amounts to 14–16%. After subsequently conditioning at 20° C. and 65% relative moisture the filaments are twisted under the same climatic conditions on ring twisting machines with a twist of 165 S turns. Two filaments of the rayon thus twisted are corded by further twisting.

After the treatment according to the invention the reviving agent is very uniformly distributed on the cord rayon. The fat coating amounts to 1.3%. Both the filaments and the finished cord have a soft and supple handle without feeling greasy. Any smearing of the fat coating is not detectable in the twisting processes. The adhesive power of natural and synthetic latices in cord fibres treated according to the invention is very good. The latices easily penetrate into the cord. The tendency of attaining a good bond to rubber can be improved without difficulty by the concurrent use of customary additives e.g. resorcinol formaldehyde, casein, condensation products from protein decomposition products, imines, amines and isocyanates as well as other polycondensation products. Wetting agents may also be used either prior to, or concurrently with, the latexing.

The utilization of the tensile strength and the breaking length resp., in the rayon cord treated according to the invention amounts to about 98% referred to the rayon starting material. By heating the rayon cord to 165° C. for 16 hours in a heating test any appreciable decrease of the tensile strength cannot be determined.

Component A is prepared as follows:

65 parts by weight of olive oil are briefly stirred in the cold with 35 parts of an emulsifier consisting of equal parts of an addition product of 14 mols of ethylene oxide to 1 mol of castor oil and the addition product of 4 mols of ethylene oxide to 1 mol of a saturated aliphatic $C_{12}$–$C_{14}$ alcohol. The initially occurring slight turbidity is eliminated by the addition of some cold distilled water (about 1–2%).

Component B is prepared as follows:

The sodium salt of N-stearoyl-N-methylamino acetic acid is prepared first in known manner from stearoyl chloride and the sodium salt of N-methylamino acetic acid. After adding concentrated hydrochloric acid and subsequently thoroughly purifying with methanol, N-stearoyl-N-methylamino acetic acid is recovered therefrom in pure form. The pure acid is neutralized with triethanol amine at 40–50° C.

Component C is prepared by reacting sulfochlorination products of higher aliphatic hydrocarbons boiling in the range of 300–470° C. with ammonia to form the corresponding sulfamides, converting the latter by the action of chloro-acetic acid into sulfamido acetic acids which are neutralized at 65–70° C. with equal parts of monoethanolamine and cyclohexylamine.

The mixture of components A, B and C is thoroughly stirred at 40° C. for 1½ hours. A 20% aqueous stock emulsion is then prepared therefrom.

Example 2

Polyamide yarn (1800 denier) is treated with a 10% aqueous emulsion of a mixture consisting of 80% of the component A described in Example 1, 15% of the component B described in Example 1 and 5% of the component C described in Example 1.

The 10% emulsion is fed to the oil circulation of a draw-off machine which is used for the production of continuous polyamide yarn. The rotation speed of the preparation rollers is adjusted in such a manner that the filaments are given an oil coating of 1%. The filaments are then stretched at a drawoff rate of 500 m./min. Capillary smarls are not formed, since the aqueous suspension used according to the invention ensures the formation of a strong protective film on the surface of the filaments and a good compactness. Disturbances to be attributed to a deficient stability of the aqueous emulsion, do not occur either in this case. The unwinding of the filament from the stretching cop proceeds easily. Besides, no disturbances occur in the working up, i.e. the twisting of the filaments to the final cord. The twisting of the filaments treated with the aqueous suspension does not result in any decrease of the strength properties. Cord fabric prepared from filaments treated with the aqueous suspension is resilient and soft, resistant to fatigue and high temperatures. The bonding power of rubber to polyamide cord treated with the aqueous suspension is excellent.

It may be apparent to anybody skilled in the art that many variations can be made without departing from the scope of the invention which is defined in the appended claims.

We claim:

1. A process for the treatment of synthetic filaments suitable for cord which comprises treating said filaments with an about 1–30% aqueous emulsion of a mixture of (1) 40–80% by weight of the mixture of component A consisting of at least 60% vegetable oils and substantially equal parts of the reaction product of castor oil with less than 18 mols of ethylene oxide and the reaction product of a saturated aliphatic $C_{12}$–$C_{14}$ alcohol with less than 5 mols of ethylene oxide, (2) 30–10% by weight of the mixture of component B consisting of a salt of a saturated N-acyl-N-alkyl-aminoalkylene carboxylic acid of the general formula:

$$R-CO-N(R_1)-(CH_2)_n-COOX$$

wherein R stands for aliphatic radicals of $C_{10}H_{21}$ to $C_{19}H_{39}$, $R_1$ is an alkyl radical of 1–2 carbon atoms, X is a radical of a member selected from the group consisting of monoethanol amine, diethanol amine, triethanol amine, diethylene triamine, triethylene tetramine, cyclohexyl amine, methylcyclohexyl amine and methylethyl-cyclohexyl amine, and $n$ is an integer from 1 to 4, and (3) 30–10% by weight of the mixture of component C consisting of a salt of a saturated alkyl sulfonamido alkylene carboxylic acid of the general formula:

$$R-SO_2-NH-(CH_2)_n-COOX$$

wherein R, X and $n$ have the aforesaid meaning, and wherein components B and C are present in substantially equal amounts.

2. The process of claim 1 wherein the filaments are rayon.

3. The process of claim 1 wherein the filaments are polyamide yarn.

4. A process for the treatment of synthetic filaments suitable for cord which comprises treating said filaments with an about 1–30% aqueous emulsion of a mixture of (1) 40–80% by weight of the mixture of component A consisting of at least 60% vegetable oils and substantially equal parts of the reaction product of castor oil with about 10–17 mols of ethylene oxide and the reaction product of a saturated aliphatic $C_{12}$–$C_{14}$ alcohol with 3–4 mols of ethylene oxide, (2) 30–10% by weight of the mixture of component B consisting of a salt of a saturated N-acyl-N-alkylaminoalkylene carboxylic acid of the general formula:

$$R-CO-N(R_1)-(CH_2)_n-COOX$$

wherein R stands for aliphatic radicals of $C_{10}H_{21}$ to $C_{19}H_{39}$, $R_1$ is an alkyl radical of 1–2 carbon atoms, X is a radical of a member selected from the group consisting of monoethanol amine, diethanol amine, triethanol amine, diethylene triamine, triethylene tetramine, cyclohexyl amine, methylcyclohexyl amine and methylethyl-cyclohexyl amine, and $n$ is an integer from 1 to 4, and (3) 30–10% by weight of the mixture of component C consisting of a salt of a saturated alkyl sulfonamido alkylene carboxylic acid of the general formula:

$$R-SO_2-NH-(CH_2)_n-COOX$$

wherein R, X and $n$ have the aforesaid meaning, and wherein components B and C are present in substantially equal amounts.

5. A composition for the treatment of synthetic filaments suitable for cord consisting essentially of an about 1–30% aqueous emulsion of a mixture of (1) 40–80% by weight of the mixture of component A consisting of at least 60% vegetable oils and substantially equal parts of the reaction product of castor oil with less than 18 mols of ethylene oxide and the reaction product of a saturated aliphatic $C_{12}$–$C_{14}$ alcohol with less than 5 mols of ethylene oxide, (2) 30–10% by weight of the mixture of component B consisting of a salt of a saturated N-acyl-N-alkylaminoalkylene carboxylic acid of the general formula:

$$R-CO-N(R_1)-(CH_2)_n-COOX$$

wherein R stands for aliphatic radicals of $C_{10}H_{21}$ to $C_{19}H_{39}$, $R_1$ stands for an alkyl radical of 1–2 carbon atoms, X is a radical of a member selected from the group consisting of monoethanol amine, diethanol amine, triethanol amine, diethylene triamine, triethylene tetramine, cyclohexyl amine, methylcyclohexylamine and methylethyl-cyclohexyl amine, and $n$ is an integer from 1 to 4, and (3) 30–10% by weight of the mixture of component C consisting of a salt of a saturated alkyl sulfonamido alkylene carboxylic acid of the general formula:

$$R-SO_2-NH-(CH_2)_n-COOX$$

wherein R, X and $n$ have the aforesaid meaning, and wherein components B and C are present in substantially equal amounts.

6. A composition for the treatment of synthetic filaments suitable for cord consisting essentially of an about 1–30% aqueous emulsion of a mixture of (1) 40–80% by weight of the mixture of component A consisting of at least 60% vegetable oils and substantially equal parts of the reaction product of castor oil with about 10–17 mols of ethylene oxide and the reaction product of a saturated aliphatic $C_{12}$–$C_{14}$ alcohol with 3–4 mols of ethylene oxide, (2) 30–10% by weight of the mixture of component B consisting of a salt of a saturated N-acyl-N-alkylamino-alkylene carboxylic acid of the general formula:

$$R-CO-N(R_1)-(CH_2)_n-COOX$$

wherein R stands for aliphatic radicals of $C_{10}H_{21}$ to $C_{19}H_{39}$, $R_1$ is an alkyl radical of 1–2 carbon atoms, X is a radical of a member selected from the group consisting of monoethanol amine, diethanol amine, triethanol amine, diethylene triamine, triethylene tetramine, cyclohexyl amine, methylcyclohexyl amine and methyl-ethyl-cyclohexyl amine, and $n$ is an integer from 1 to 4, (3) 30–10% by weight of the mixture of component C consisting of a salt of a saturated alkyl sulfonamido alkylene carboxylic acid of the general formula:

$$R-SO_2-NH-(CH_2)_n-COOX$$

wherein R, X and $n$ have the aforesaid meaning, and wherein components B and C are present in substantially equal amounts.

References Cited by the Examiner
UNITED STATES PATENTS

| | | | |
|---|---|---|---|
| 1,970,578 | 8/1934 | Schoeller et al. | 252—8.9 XR |
| 2,047,066 | 7/1936 | Glietenberg | 252—356 XR |
| 2,164,431 | 7/1939 | Schoeller et al. | 252—8.9 XR |
| 2,243,437 | 5/1941 | Orthner et al. | 260—518 XR |
| 2,663,989 | 12/1953 | Schlatter et al. | 252—8.9 XR |
| 2,803,565 | 8/1957 | Sagar | 252—8.9 XR |
| 2,877,178 | 3/1959 | Bergman et al. | 252—8.8 |

OTHER REFERENCES

Schwartz et al.: "Surface Active Agents," Interscience Publishers, Inc., New York, copyright 1949 (pp. 222–224).

JULIUS GREENWALD, *Primary Examiner.*